(12) United States Patent
Makaran

(10) Patent No.: US 7,248,005 B2
(45) Date of Patent: Jul. 24, 2007

(54) DUAL MOTOR ARRANGEMENT AND CONTROL METHOD

(75) Inventor: John E. Makaran, London (CA)

(73) Assignee: Siemens Canada Limited, Chatham (CA)

( * ) Notice: Subject to any disclaimer, the term of this patent is extended or adjusted under 35 U.S.C. 154(b) by 0 days.

(21) Appl. No.: 11/339,213

(22) Filed: Jan. 25, 2006

(65) Prior Publication Data

US 2006/0175992 A1  Aug. 10, 2006

Related U.S. Application Data

(60) Provisional application No. 60/646,850, filed on Jan. 25, 2005.

(51) Int. Cl.
*H02P 5/00* (2006.01)

(52) U.S. Cl. ............................. 318/66; 318/34; 388/804

(58) Field of Classification Search ............ 318/34–68; 388/804
See application file for complete search history.

(56) References Cited

U.S. PATENT DOCUMENTS

| | | | |
|---|---|---|---|
| 6,433,507 B1 * | 8/2002 | Makaran et al. ............ 318/811 |
| 6,621,309 B2 * | 9/2003 | Roder et al. ................. 327/110 |
| 6,774,587 B2 * | 8/2004 | Makaran et al. .............. 318/34 |
| 6,836,092 B2 * | 12/2004 | Sivertsen ..................... 318/639 |
| 6,933,687 B2 * | 8/2005 | Makaran et al. .............. 318/34 |
| 7,006,761 B2 * | 2/2006 | Herke ......................... 388/804 |
| 2003/0034808 A1 * | 2/2003 | Roder et al. ................. 327/110 |
| 2003/0117093 A1 * | 6/2003 | Makaran et al. .............. 318/34 |
| 2004/0179830 A1 * | 9/2004 | Sunaga et al. .............. 388/804 |
| 2005/0074229 A1 * | 4/2005 | Herke ........................ 388/804 |
| 2006/0175992 A1 * | 8/2006 | Makaran ...................... 318/66 |

* cited by examiner

*Primary Examiner*—Paul Ip

(57) ABSTRACT

A dual motor arrangement includes a first motor M1, a first MOSFET Q1 constructed and arranged to control operation of the first motor, a second motor M2, a second MOSFET Q2 constructed and arranged to control operation of the second motor, an RFI filter structure L1, C_RFI, a freewheeling circuit L2, C2, and a controller S. The controller is constructed and arranged to provide a first PWM signal to the first MOSFET and a second PWM signal to the second MOSFET. The second PWM signal is in staggered time relation with respect to the first PWM signal. When one motor is in a freewheeling mode of operation for at least a portion of a time that the MOSFET, associated with the other motor, is on, freewheeling of the one motor decreases an amount of current drawn by the other motor during turn on of the other motor. The inductors L1, L2 can be coupled to define a transformer.

16 Claims, 4 Drawing Sheets

Mode I　　　　　　　　　　　　　Mode II

DUAL MOTOR ARRANGEMENT AND CONTROL METHOD

This application is based on U.S. Provisional Application Ser. No. 60/646,850, filed on Jan. 25, 2005 and claims the benefit thereof for priority purposes.

FIELD OF THE INVENTION

This invention relates to electric fan cooling modules for vehicles and, more particularly, to control of dual motors in an engine cooling module.

BACKGROUND OF THE INVENTION

Electric engine cooling fan modules have become standard in most automobiles with front wheel drive. Depending on the application, single and dual fan engine cooling modules are used to provide engine cooling. In the past, single and dual speed fan modules have dominated the market. However, recently, variable speed motor drives have been implemented for single and dual cooling fan modules employing brush type motors to improve system efficiency.

Dual engine cooling fan modules have been in automobiles since the advent of electrodrive cooling fan modules in the previous decades. Single speed and dual speed variations of these modules exist which are capable of varying the amount of airflow delivered to engine through the switching arrangement of the motors. With reference to FIG. 1, one such arrangement 10 is the so called "series parallel connection" which uses relays 12 to switch motors M from a parallel connection to a series connection in order to achieve full speed and reduced speed operation.

Variable speed drives for dual fan arrangements have been in production since 1996. With reference to FIG. 2, these variable speed drive systems typically use pulse width modulation (PWM) to control the speed of the motors M, either independently, or together. A block diagram of a dual fan module 20 using simultaneous PWM control 14 for both motors M is shown in FIG. 2. Simultaneous control of both motors M is a cost-effective solution, in that the complexity of the control logic is reduced. In such a system, care should be taken to separate the maximum speed of both motors to prevent acoustic "beating", or heterodyning.

A block diagram of a dual fan module 30 using independent PWM control 14' for both motors M is shown in FIG. 3. For clarity, components such as DC link capacitors and radio frequency interference (RFI) suppression chokes have been excluded in FIGS. 2 and 3. Independent motor control has numerous benefits, including, better temperature control and increased fault tolerance due to the separation of the two motor power stages. Separate motor control can be more expensive than simultaneous motor control due to the cost of the control electronics.

Depending on the PWM switching strategy employed, there is a need to provide separate motor switching schemes that will result in lower stress on power stage components and lower conducted and radiated radio frequency emissions. Also, there is a need to lower conducted RFI emissions today's automobile since the electronic content in automobiles is increasing.

SUMMARY OF THE INVENTION

An object of the present invention is to fulfill the need referred to above. In accordance with the principles of the present invention, this objective is obtained by a providing a dual motor arrangement that includes a first motor; a first MOSFET constructed and arranged to control operation of the first motor; a second motor; a second MOSFET constructed and arranged to control operation of the second motor; RFI filter structure; a freewheeling circuit; and a controller. The controller is constructed and arranged to provide a first PWM signal to the first MOSFET and a second PWM signal to the second MOSFET. The second PWM signal is in staggered time relation with respect to the first PWM signal. When one motor is in a freewheeling mode of operation for at least a portion of a time that the MOSFET, associated with the other motor, is on, freewheeling of the one motor decreases an amount of current drawn by the other motor during turn on of the other motor.

In accordance with another aspect of the invention, a method of operating a dual motor arrangement is provided. The arrangement includes a first motor; a first MOSFET constructed and arranged to control operation of the first motor; a second motor; a second MOSFET constructed and arranged to control operation of the second motor; RFI filter structure; a freewheeling circuit; and a controller. The method provides, via the controller, a first PWM signal to the first MOSFET and a second PWM signal to the second MOSFET with the second PWM signal being in staggered time relation with respect to the first PWM signal. The method ensures that one motor is in a freewheeling mode of operation for at least a portion of a time that the MOSFET, associated with the other motor, is on, such that freewheeling of the one motor decreases an amount of current drawn by the other motor during turn on of the other motor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE PRESENTLY PREFERRED EXEMPLARY EMBODIMENTS

Figure 1:
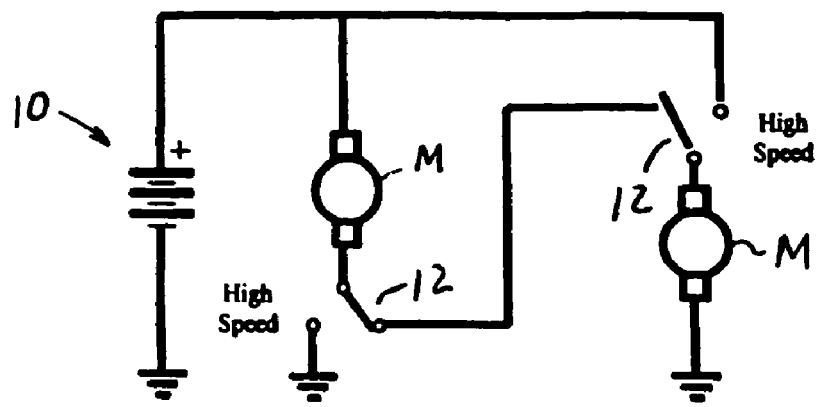
FIG. 1 is a schematic illustration of a conventional series-parallel dual cooling fan module configuration.
Figure 2:
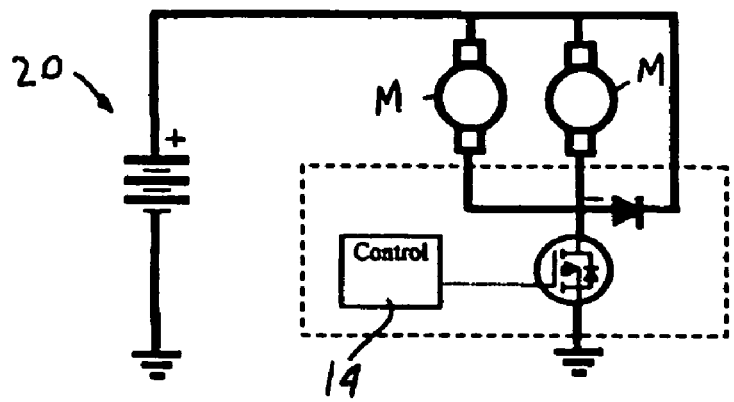
FIG. 2 is a schematic illustration of a conventional dual cooling fan module with simultaneous PWM control.
Figure 3:
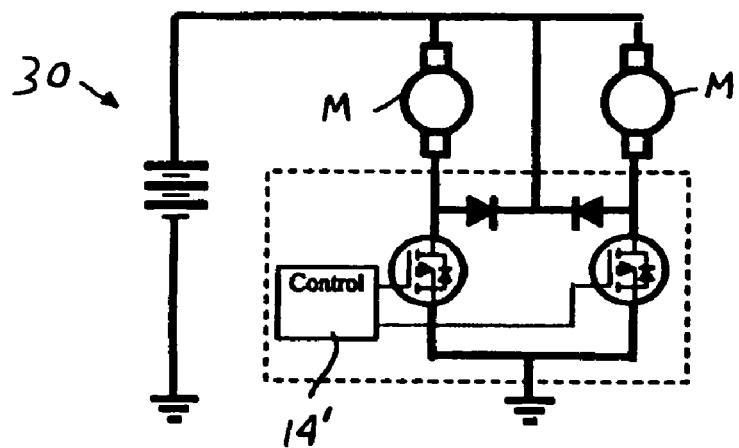
FIG. 3 is a schematic illustration of a conventional dual cooling fan module with separate PWM control.
Figure 4:
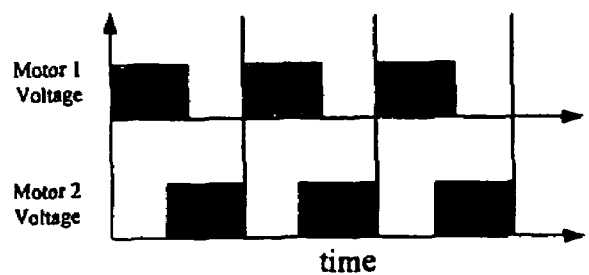
FIG. 4 shows conventional staggered PWM waveforms to reduce conducted emissions in inductive loads.

In inductive loads, it has been shown that independent control by staggering PWM switching waveforms in the manner outlined in FIG. 4 is an effective technique to lower conducted RFI emissions. Furthermore, conducted RFI emission in dual modules can be further lowered through power stage design.

Figure 5:
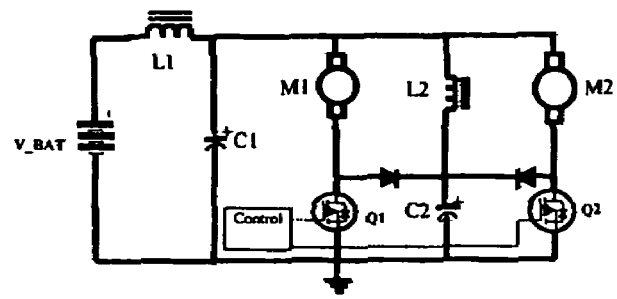
FIG. 5 is a schematic illustration of a conventional single channel PWM controller power stage.

An existing PWM controller power stage for dual motor control is presented in FIG. 5. In this figure, the motors are M1 and M2, the MOSFETs are Q1 and Q2. In addition, the DC the link capacitor (C1) and RFI choke (L1) have been shown. The supply current ripple in this configuration is minimized through the use of the capacitive and inductive elements in the freewheeling circuit, L2 and C2 respectively. In order to understand the effect of these elements on the operation of the circuit, one must first consider the operational modes of the circuit. In this case, it is assumed that the motors are switched simultaneously. Consequently, in order to simplify the circuit for analysis purposes, both motor loads can be modeled as a single motor. As such, there are two modes of motor operation that must be considered. The first mode is when the switching MOSFETs for both motors are on and is designated as Mode I of operation. The second mode occurs when both motors are freewheeling and is designated as Mode II of operation. The modes of operation are illustrated in FIGS. 6a and 6b.

Figures 6A, 6B:
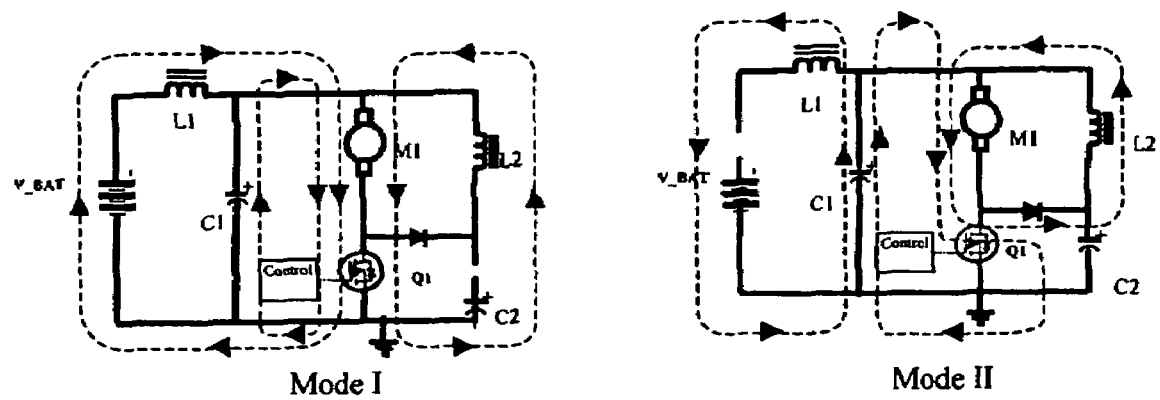
FIG. 6a shows a first mode of operation of a PWM circuit with auxiliary power stage components.
FIG. 6b shows a first mode of operation of a PWM circuit with auxiliary power stage components.

As may be seen in FIG. 6a, the motor current during Mode I, is the sum of the contributions from the battery, the DC link capacitor, C1, and the freewheeling capacitor, C2. During Mode I, C2 is unloaded through L2, delaying the discharge of this component. The additional current provided by C2 through L2, reduces the battery current draw during the period of time MOSFET Q1 is turned on.

In Mode II of operation, the motor M1 is freewheeling. During this mode of operation, the freewheeling capacitor, C2 is replenished using a portion of the motor freewheeling current, while the remainder of the freewheeling current flows through the freewheeling diode and freewheeling inductor, L2. The freewheeling inductor L2 decreases the rate of change in the freewheeling motor current; thereby helping to minimize line current ripple and to mitigate high frequency conducted RFI emissions. During this mode of operation, the DC link capacitor, C1 discharges through the RFI choke, L1 which helps to minimize the line current ripple during the period of time current is not drawn from the battery. In accordance with the principles of the invention, in order to minimize the size of the reactive components and to reduce current ripple even further, the switching scheme outlined in FIG. 4 can be used with the power stage topology outlined in FIG. 5. The RFI filter 16 mitigates high frequency conducted RFI emissions and the further reduction of current line ripple can be achieved through switching scheme illustrated in FIG. 5. This dual motor arrangement 40 is outlined in FIG. 7. If the PWM scheme in FIG. 4 is used to control the dual motor embodiment of FIG. 7, it is evident that one motor will be in freewheeling mode (Mode II) for at least a portion of the time the other motor is in Mode I of operation.

Figure 7:
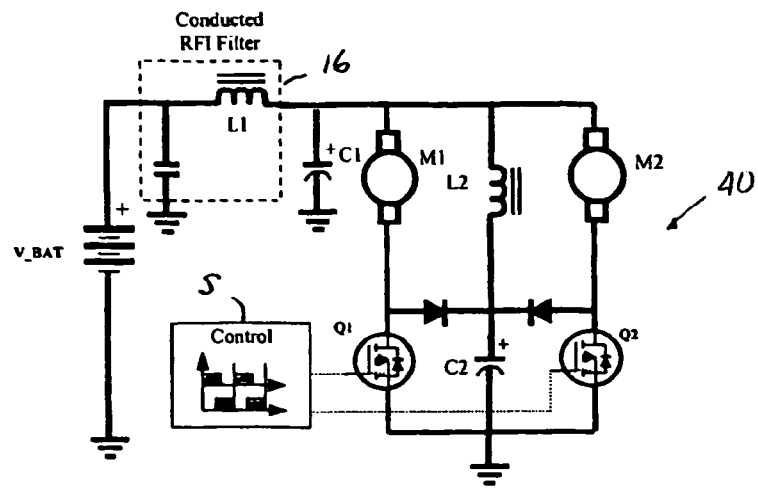
FIG. 7 is a schematic illustration of a dual motor PWM controller configuration with a staggered switching scheme in accordance with the invention.
Figure 8:
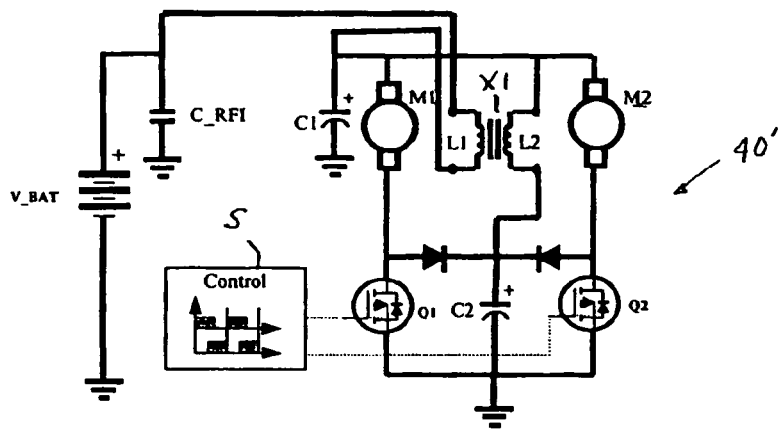
FIG. 8 is a schematic illustration of a dual motor controller configuration in accordance with the invention.

In accordance with another embodiment of the invention, a dual motor arrangement 40' is shown in FIG. 8 that reduces the size of reactive components, and combines the function of the RFI choke of FIG. 7. The motors are indicated at M1 and M2, and the associated MOSFETs are Q1 and Q2 that receive control signals from a controller S. This embodiment takes advantage of the fact that when one motor is switching, the other is in freewheeling mode, so that the freewheeling of one motor is used to decrease the amount of current drawn by the other motor during turn on. More particularly, C2 is unloaded through L2, delaying the discharge of this component. The additional current provided by C2 through L2, reduces the battery current draw during the period of time MOSFET Q1 is turned on.

Figure 9:
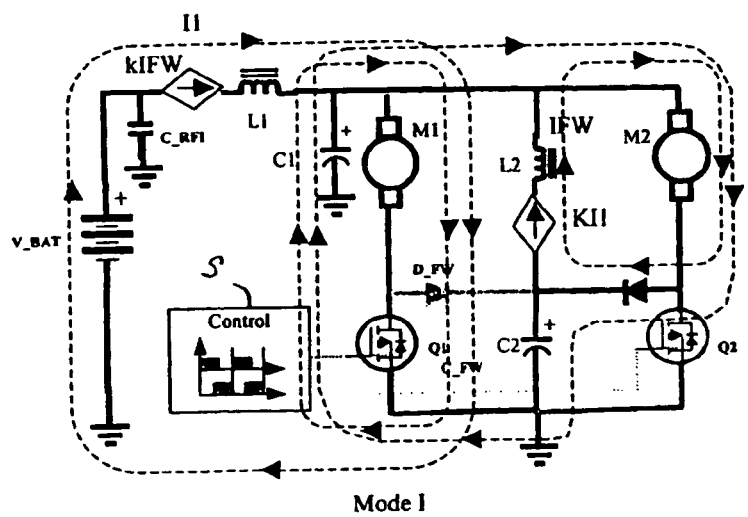
FIG. 9 is a schematic illustration of a mode of operation of the PWM controller of FIG. 8.

The effect of the replacement of L1 and L2 with a transformer X1 can be illustrated by considering operational Modes I and II separately and modeling the coupled voltages as a dependent voltage supply as shown in FIG. 9. In FIG. 9, in addition to the contribution to the motor current from the battery, C1, and C2, there is an additional contribution from the freewheeling current flowing through L2, and coupled into L1 (transformer X1). This additional component will further reduce the current draw from the battery during the period of time motor, M1 is on.

Mode II of operation is identical to Mode I, however, with motor, M1 freewheeling and motor, M2 conducting. As may be seen in FIG. 10, the freewheeling current from M2 is used to decrease the conduction current in M1 due to the action of the transformer comprised of L1 and L2.

In order to illustrate the effect of the arrangement of FIG. 8, a dual PWM controller was constructed using the power stage illustrated in FIG. 5, using the staggered switching scheme illustrated in FIG. 4. The line current was measured for three different duty cycles and compared to the waveforms obtained using the same duty cycles for the power stage configuration illustrated in FIG. 9, using the same staggered PWM scheme. For the sake of comparison, all power stage component values remained the same. The transformer X1, was formed by combining L1 and L2 on a single rod core. The number of turns on L1 and L2 were preserved from the case where they were separate. The experimental results appear in FIGS. 10, 11 and 12 for PWM duty cycles of 30%, 40%, and 70% respectively. In these figures, the gate waveforms of the two motor MOSFETs appear as the two thick-lined waveforms. As may be seen, the gate waveforms are staggered in the manner described in FIG. 4. The two line current waveforms were compared to illustrate the effectiveness of this power stage proposal. A switching frequency of 20 kHz was used.

Figure 10:
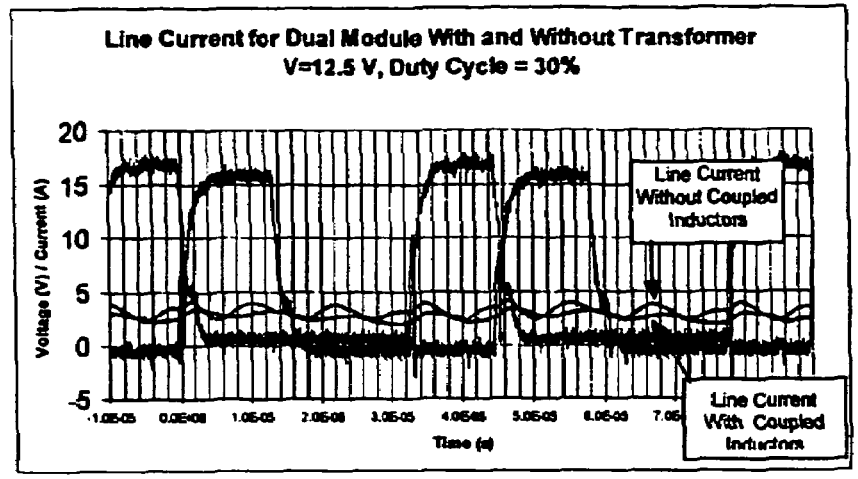
FIG. 10 shows waveforms for the PWM controller of the invention using a 30% duty cycle.
Figure 11:
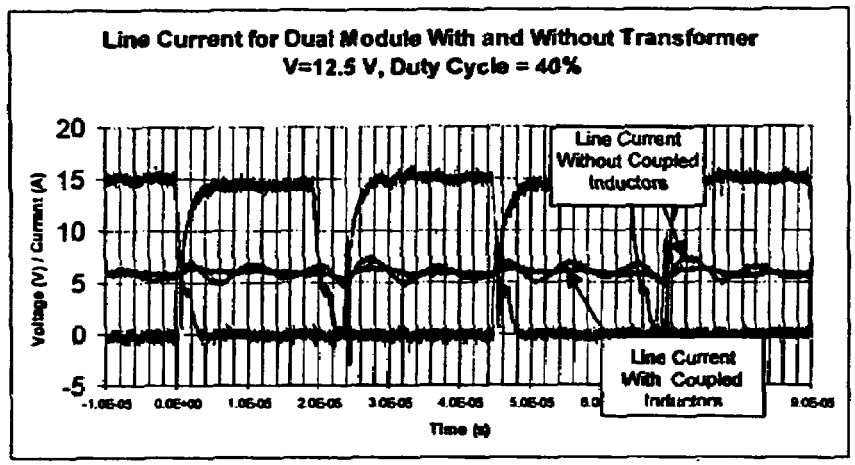
FIG. 11 shows waveforms for the PWM controller of the invention using a 40% duty cycle.
Figure 12:
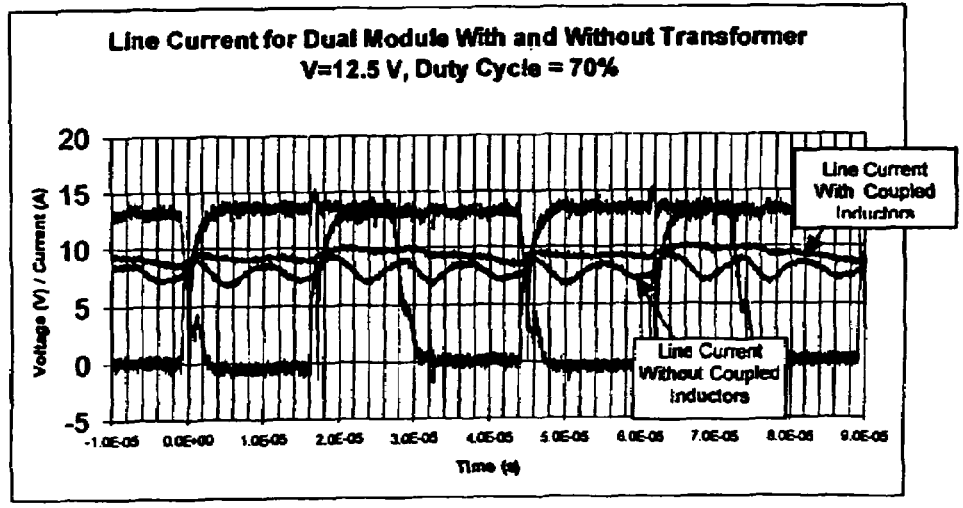
FIG. 12 shows waveforms for the PWM controller of the invention using a 70% duty cycle.

As may be seen in FIGS. 10 to 12, the line current obtained using the proposed PWM controller configuration is beneficial in terms of reduction of line current ripple. For example, in the 70% Duty Cycle case, the line current ripple was decreased from approximately 2 A to approximately 1 A.

Thus, the disclosed embodiments disclose the control of dual, variable speed, engine cooling fan modules (e.g. motors) that minimizes current ripple and conducted radio frequency interference (RFI) emissions.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A dual motor arrangement comprising:
   a first motor,
   a first MOSFET constructed and arranged to control operation of the first motor,
   a second motor,
   a second MOSFET constructed and arranged to control operation of the second motor,
   RFI filter structure associated with the first and second motors, the RFI filter structure including a first inductor associated with an RFI capacitor,
   a freewheeling circuit associated with the first and second motors, the freewheeling circuit including a second inductor and an associated freewheeling capacitor, the second inductor and the first inductor being coupled to define a transformer, and
   a controller constructed and arranged to provide a first PWM signal to the first MOSFET and a second PWM signal to the second MOSFET, the second PWM signal being in staggered time relation with respect to the first PWM signal,
   wherein when one motor is in a freewheeling mode of operation for at least a portion of a time that the MOSFET, associated with the other motor, is on, freewheeling of the one motor decreases an amount of current drawn by the other motor during turn on of the other motor.

2. The arrangement of claim 1, further including a DC link capacitor associated with the first inductor to reduce supply current ripple.

3. The arrangement of claim 1, wherein the second inductor and the first inductor are combined on a single rod core.

4. The arrangement of claim 3, wherein the transformer is constructed and arranged to decrease the current draw.

5. The arrangement of claim 1, wherein the second inductor and the associated freewheeling capacitor are constructed and arranged to reduce supply current ripple.

6. A dual motor arrangement comprising:
   a first motor, a first means for switching constructed and arranged to control operation of the first motor,
   a second motor,
   a second means for switching constructed and arranged to control operation of the second motor,
   means, associated with the first and second motors, for filtering RFI, the means for filtering RFI including an RFI capacitor and an associated first inductor,
   a freewheeling circuit associated with the first and second motors, the freewheeling circuit including a second inductor and an associated freewheeling capacitor, the second inductor and the first inductor being coupled to define a transformer , and
   means for providing a first signal to the first means for switching and a second PWM signal to the second means for switching, the second signal being in staggered time relation with respect to the first signal,
   wherein when one motor is in a freewheeling mode of operation for at least a portion of a time that the means for switching, associated with the other motor, is on, freewheeling of the one motor decreases an amount of current drawn by the other motor during turn on of the other motor.

7. The arrangement of claim 6, further including a DC link capacitor associated with the first inductor to reduce supply current ripple.

8. The arrangement of claim 6, wherein the second inductor and the first inductor are combined on a single rod core.

9. The arrangement of claim 8, wherein the transformer is constructed and arranged to decrease the current draw.

10. The arrangement of claim 6, wherein the first and second means for switching are each a MOSFET and the first and second signals are PWM signals.

11. The arrangement of claim 6, wherein the second inductor and the associated freewheeling capacitor are constructed and arranged to reduce supply current ripple.

12. A method of operating a dual motor arrangement, the arrangement including a first motor, a first MOSFET constructed and arranged to control operation of the first motor, a second motor, a second MOSFET constructed and arranged to control operation of the second motor, RFI filter structure associated with the first and second motors, the RFI filter structure including a first inductor associated with an RFI capacitor, a freewheeling circuit associated with the first and second motors, the freewheeling circuit including a second inductor and an associated freewheeling capacitor, the second inductor and the first inductor being coupled to define a transformer, and a controller, the method including:
   providing, via the controller, a first PWM signal to the first MOSFET and a second PWM signal to the second MOSFET with the second PWM signal being in staggered time relation with respect to the first PWM signal, and
   ensuring that one motor is in a freewheeling mode of operation for at least a portion of a time that the MOSFET, associated with the other motor, is on, such that freewheeling of the one motor decreases an amount of current drawn by the other motor during turn on of the other motor.

13. The method of claim 12, wherein the second inductor and the first inductor are combined on a single rod core.

14. The method of claim 12, wherein the ensuring step includes ensuring that the transformer is constructed and arranged to decrease the current draw.

15. The method of claim 12, further including reducing supply current ripple via the second inductor and the associated freewheeling capacitor.

16. The method of claim 12, further including reducing supply current ripple by providing a DC link capacitor associated with the first inductor.

* * * * *